June 22, 1937.　　　G. MORBELLI　　　2,084,354
METHOD OF MAKING ASBESTOS CEMENT PRODUCTS
Filed April 25, 1934
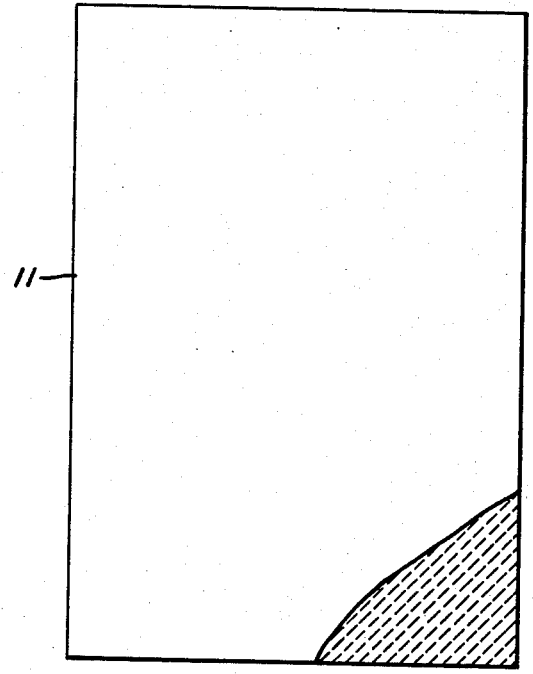
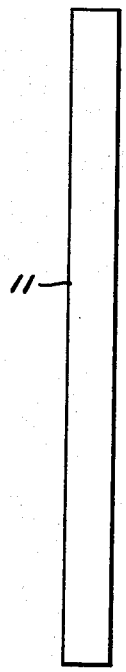
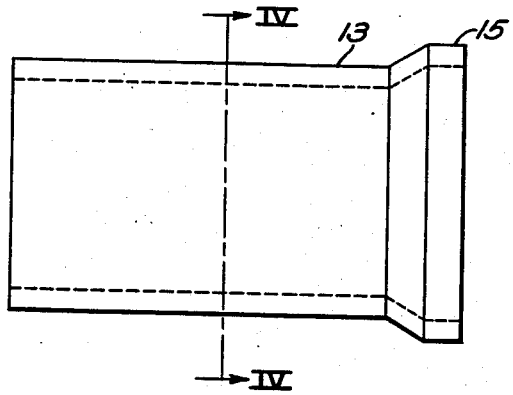
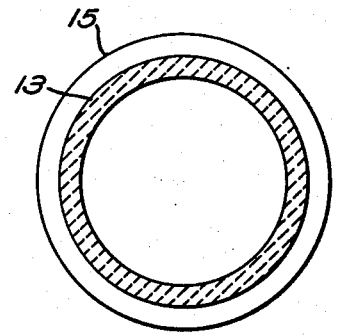
INVENTOR
Giovanni Morbelli
BY
ATTORNEY

UNITED STATES PATENT OFFICE 2,084,354

METHOD OF MAKING ASBESTOS CEMENT PRODUCTS

Giovanni Morbelli, Milan, Italy, assignor to Frederick O. Anderegg, Forest Hills Boro, Pa.

Application April 25, 1934, Serial No. 722,279. In Germany August 24, 1929

2 Claims. (Cl. 18—47.5)

My invention relates to asbestos cement products and has for its main object the provision of a new and improved process for making self-setting asbestos cement products.

Another object of my invention is to provide a new asbestos cement product having greatly improved mechanical strength and resistance to pure and to acidulated fluids and also to other deleterious fluids.

Another object of my invention is to provide a new process for making asbestos cement products that shall require a much shorter time than has been customary heretofore.

Another object of my invention is to provide an asbestos cement product that shall contain no uncombined binder and that shall be water-impervious.

Another object of my invention is to provide an asbestos cement product in which the original calcareous and siliceous constituents are no longer present in their original condition in the finished product, but have been changed completely by the chemical reaction occurring during the process of manufacture, into a very durable and resistant material.

In practicing my invention, I mix a calcareous binder such as Portland cement with a siliceous material and with asbestos fiber, in such proportions that there shall be no chemically free lime in the final product, and that the siliceous material will have been changed into an amorphous body, grind the mixture very fine, either wet or dry, form the shapes, allow them to set for a certain length of time and indurate them under steam pressure.

In a modification of my invention I may use alumina, oxide of iron or calcined clay, or certain kinds of silicic acid of high reactivity to replace a part of the siliceous materials suggested in my original application.

Among the binders or calcareous cements which I may use are the following: hydraulic lime, natural or Portland cement, pozzuolana cements, calcareous hydraulic cement or the like, and among the siliceous materials which I may use are the following: quartz, quartzite, siliceous sand and shingle, sandstone granites, natural and artificial pozzuolana, trass, slags, and the like.

The raw materials, i. e., the binder and the siliceous material are ground very fine, at least as fine as ordinary cement, and may be ground separately and then mixed in the proper proportion or they may be mixed and then ground. At present I prefer to grind the siliceous material and the binder in a dry condition, although such a mixture may be ground in a wet condition.

When practicing the modification of my invention and using an addition of alumina or oxide of iron to the siliceous material, the amount of these additions should be equivalent to or more than twice the amount of lime contained in the cement. A clay which has been calcined at about 600 to 800° C. is especially suited for my purpose. I may however, use silicic acids of non-crystalline structure and of high natural reactivity, or in which such reactivity has been effected by heating, such materials including quartzite, chalcedony, opal, diatomaceous earth, sandstones containing silicic acid, precipitated silicic acid or quartz which has been changed into an amorphous condition by heating. Such silicic acid of amorphous, colloidal or hydrated characteristic is especially advantageous when operating in the range of two hydraulic factors to one of lime (by weight). By hydraulic factor is meant the per cent of $SiO_2$ plus per cent of $Al_2O_3$ plus per cent $Fe_2O_3$. Thus a mixture of 50% to 70% of opal or other siliceous material with 50% to 30% of Portland cement or a mixture of 40% to 50% of silicate and 60% to 50% Portland cement will be representative of such condition. When working with small additions of such materials it is desirable to grind them very fine.

The method employed by me in the next step of my process, that of forming the shapes, may vary. Thus I may add water to the above described mixture of hydraulic lime or its equivalent, silicate and asbestos, so that it will have the consistency of thick cream or mud, after which plates or slabs can be formed in a press, or tubes can be made in a centrifugal or in an extrusion machine. I may use only a small amount of water to form a semi-dry mixture and then form the material into the desired shapes manually, although I prefer to use pressures up to 6,000 pounds per square inch.

After the shapes have thus been formed they are allowed to set for a period on the order of 24 hours. Careful tests have shown that this step in the process is a very important one, as a part of the lime is set free by hydration of di- or tri-calcium silicates, part remains in combination and part is held within the silicate gel resulting from the hydration and which is the chief binding agent. This hydration is preferably effected at ordinary room temperatures.

The shapes are then indurated in a closed container in steam at a pressure of about 150 pounds per square inch and for a length of time on the order of 8 hours or more. During this step of the process the free lime is brought into combination with the silica, and it is believed that a part of the lime in the silicate gel is removed therefrom and is combined with the silica. It is probable also that some of the lime of the unhydrated calcareous cement is brought into combination with the silica. Information obtained from petrographic examination of the final product and from other tests indicates that the silica has been changed into an amorphous body, having certain very desirable characteristics for my purpose, which will be referred to hereinafter in detail.

The indurated shapes are then permitted to cool, after which they are ready for use. When practicing the modified process I may take 55 parts by weight of clay containing 98% of ($SiO_2$ plus $Al_2O_3$ plus $Fe_2O_3$) plus 2% CaO, which has been calcined at from 600° to 800° C. and then ground to a fineness such that there will be a residue of not more than 5% when passed through a 180 mesh screen, mix this thoroughly with 45 parts commercial cement having 65% of CaO and with from 15 to 20 parts of asbestos fiber and enough water to form a thick slurry, press the mixture into the desired shapes, allow them to set and then indurate them in an autoclave. As an example of the steam pressure and the time of induration I may use 75 pounds of steam pressure for 8 hours and if a steam pressure of 45 pounds is used the time is increased to 20 hours. There is thus an interrelation between the steam pressure and the length of time, that is the lower the steam pressure, down to a certain minimum value, the longer the time required.

The product embodying my invention can be used in many different fields and I have shown several forms which can be made by the use of the process described hereinbefore.

In the single sheet of drawing,

Figure 1 is a view, in front elevation, of a slab or plate embodying my invention, Fig. 2 is a view, in side elevation, of the plate or slab shown in Fig. 1, Fig. 3 is a view, in front elevation, of a pipe, and, Fig. 4 is a section view therethrough, taken on the line IV—IV of Fig. 3.

An important field of application is for roof slabs of relatively large size and a slab or plate 11 is shown in Figs. 1 and 2 of the drawing. For illustrative purposes only it may be mentioned that slabs of this kind can be made on the order of five feet wide, ten or twelve feet long, and on the order of ⅛" to ¼" or more thick, but I wish it to be understood that I do not wish to be limited to these particular dimensions. Pipes suitable for water, oil, gasolene, gas, and the like are being manufactured in diameters to about 16 inches and in lengths to nearly 50 feet.

Referring to Figs. 3 and 4 I have there illustrated a tube 13 in the form of an ordinary sewer pipe, provided with a bell mouth 15 at one end thereof to permit of interfitting the successive tubes or pipes. Again I do not wish to be limited to the particular shape since the pipe or tube may just as well be made to have a constant internal and external diameter. Tubes or pipes of the kind resulting from the practice of the process embodying my invention, and also embodying my invention in themselves have been found applicable to a great many uses. Thus they have been found to withstand attacks of chemically pure water, of acidulated water, and of various fluid substances including acids, oils, and the liquors resulting from certain processes used in industry.

Some figures as to the modulus of rupture of flat plates may be here given in order to show the extraordinary great strength obtained in such plates. Thus a small plate having a thickness of substantially .09" had a modulus of rupture of 7,800 lbs. per square inch. A plate having a thickness of .102" had a modulus of rupture of 8,000 lbs. per square inch, while a number of other plates made at the same time showed substantially the same value for the modulus of rupture. All of these plates were made at the same time with a proportion of one part of cement to three parts of silica, by weight, and about 15% of asbestos fiber.

A number of tubes were made according to my improved process, using one part, by weight, of cement to three parts of finely ground silica, 19% of asbestos being added thereto during the process of manufacture. These tubes were subjected to a preliminary setting for about 24 hours and were then steam treated in an autoclave for about 8 hours at a pressure of 130 pounds per square inch. Tubes having a length of four meters, an internal diameter of 12.5 centimeters and a wall thickness of 9.5 mm. had a modulus of rupture of about 4,200 pounds per square inch, the bursting pressure being about 6,800 pounds per square inch. A tube having a length of four meters, an internal diameter of 10 centimers and a wall thickness of 8 mm showed a modulus of rupture of 3,900 pounds per square inch, the bursting pressure being 6,800 pounds per square inch. A tube three meters long, with an internal diameter of 8 centimeters and a wall thickness of 9.2 mm showed a modulus of rupture of 3,950 pounds per square inch, the bursting pressure being 10,000 pounds per square inch.

Products embodying my invention have been subjected to various uses in actual practice and have shown great resistance to wear, to shocks, to the friction of liquids flowing through tubes, and to other causes which tend to destroy such material. Actual tests have shown that the resistance to abrasion of my improved product is about twenty times greater than that of the older kinds of asbestos cement.

A number of tests were made to determine the behavior of my improved product when subjected to acid solutions. A number of small plates were made, each 8 x 12 cm. and 4 mm. thick, both by the older processes and by the process embodying my invention. The two sets of plates were suspended vertically in containers having different acid solutions therein, which solutions were renewed daily in order to ensure that the dilution thereof should not drop below 25% of the initial concentration. Two different acid solutions were used, one a hydrochloric acid solution of 50 grams of concentrated acid in a liter of water and the other a nitric acid solution of 100 grams of acid in a liter of water, but other acid solutions were also used, such as natural acids from mineral sources, pits and mines. These tests showed in general that while the product made by the older methods was attacked very quickly and in some cases almost completely dissolved, the silica content in my product was not dissolved to any appreciable degree.

Thus the decrease in weight, in per cent, of the ordinary asbestos cement product made by the older methods when subjected to the action of hydrochloric acid for one week was substantially 69.3%, while at the end of the fourth week the reduction in weight was 78.3%. My asbestos cement had a reduction in weight at the end of the first week of suspension in hydrochloric acid, of 21.2% and showed a decrease of only 30.5% at the end of the fourth week. In other words, the reduction in weight in my product was about one third that of the ordinary prior-art asbestos cement. When the ordinary asbestos cement product was subjected to the action of the above described nitric acid solution, the per cent loss in weight at the end of the first week was 76.6%, and the loss in weight at the end of the fourth week was 79.1%. My improved product, when subjected to the same conditions showed a loss of only 26.0% at the end of the first week, which loss in weight increased to only 30.3% at the end of the fourth week. Here again the loss in weight in my product was substantially one third that in the ordinary product.

Tests were also made on the same kind of plates as to the modulus of rupture of the two products, after they had been subjected to the solution of hydrochloric acid or of nitric acid. Plates of the ordinary type showed a modulus of rupture of 700 pounds per square inch at the end of the first week of immersion in the hydrochloric acid solution, while at the end of the second week the modulus of rupture was zero and the plates were very strongly disintegrated, having in general the appearance of thoroughly wetted pasteboard. Plates embodying my invention showed a modulus of rupture of 1,850 pounds per square inch at the end of the first week of immersion in a hydrochloric acid solution, a modulus of rupture of 2,150 pounds per square inch at the end of the second week, this figure increasing to 2,550 pounds at the end of the fourth week, the plates showing no visible change whatever in appearance.

Plates subjected to the nitric acid solution, of the ordinary asbestos cement showed a zero modulus of rupture at the end of the first week, the plates being very much disintegrated. Plates embodying my invention showed a modulus of rupture of 2,400 pounds at the end of the first and at the end of the second week, this figure increasing to about 2,500 pounds at the end of the fourth week, the plates showing no visible change in appearance.

Tests have also been made on my improved product to determine their action when subjected to pure water or to water containing carbonic and other similar acids. Tubes were used in this test and subjected both to the action of distilled water, as well as to water containing carbonic acid. The test duration was 20 days. The ordinary asbestos cement product showed a reduction in weight of 0.26 gram per square decimeter at the end of this period of time, while the tubes embodying my invention showed no reduction in weight. Tubes of the ordinary product submitted to the action of water containing carbonic acid for 20 days showed a decrease in weight of 5.66 grams per square decimeter of surface area, while tubes embodying my invention showed a reduction of only 0.77 gram per square decimeter of surface area.

When products embodying my invention and the older kind of asbestos cement were submitted to a 7% solution of sulphate of magnesium and to water saturated with calcium sulphate for a year's time, the tubes embodying my invention still retained their external aspect, their volume, and their initial structure and strength. Tubes embodying the prior-art asbestos cement showed signs of change after 60 days of such immersion, particularly swellings of the kind usually called or caused by the "cement bacillus", and they had also lost their cohesion.

Tests have also been made on the earlier kind of asbestos cement and on my improved product by submitting them to the action of high temperature, on the order of 700° to 800° C., for 24 hours. The ordinary asbestos cement products showed a large deformation and had lost practically all of their strength, while my product retained its original form and a large part of its original strength.

My improved process differs in the hereinbefore described essential details from those used heretofore, with the result that my improved product distinguished in many important characteristics from the prior-art material of the same general kind, which differences have been set forth in detail hereinbefore. I wish to again point out that the character of the final product in my invention is very different from that of the prior art, particularly in that the silica is present in a very hard, hornlike amorphous state so that it can not be easily attacked and dissolved out by corrosive fluids. Tests made by myself and by others have shown that there is practically never any free lime in the finished product, particularly because of the excess of silica used in the mixture and also because of the specific steps in the process of manufacture. The lack of free lime and the state of the silica result in the retention of the shape and the strength of my product under the most adverse conditions, as set forth above.

I am aware that the prior art has suggested the use of ordinary lime, siliceous material and asbestos, but wish to clearly distinguish my process from one of those used heretofore in the making of asbestos sand lime shapes. It is set forth that the shaped members must be indurated while under mechanical compression, which clearly shows that the lime used is not a hydraulic lime but only ordinary lime. A method of this kind is suitable only in the manufacture of simple shapes, such as flat tiles, roof sheets and the like and can not be used in the manufacture of tubes and other complicated shapes which can not be maintained under proper mechanical pressure until indurated.

Another process includes the use of only five per cent of a form of silicic acid. This amount of silica, no matter how reactive its form, is not sufficient to take care of the lime set free during hydration. The result is a product having an alkaline reaction which is more readily attacked by corrosive agencies.

Let it be assumed that a Portland cement containing 64% of lime and 22% of silica is mixed with 5% of anhydrous silica, and with asbestos,— and indurated by steam pressure. Assuming that the final product contains $3CaO.2SiO_2$ (in a hydrated condition) 31 parts of the 64 parts of the lime initially in the cement will have been combined, leaving 33 parts still free, which would require an additional 35 parts of reactive silica to be completely chemically combined.

When equal amounts of silica and of Portland cement are mixed or an excess of silica is mixed with Portland cement, subjected to hydrating conditions for a period on the order of 24 hours and then indurated by steam under pressure, as is proposed by me in the present application, an excess of silica is present at all times, in fact more than enough for the formation of the end product, hydrated monocalcium silicate. Petrographic examination shows that the excess silica appears to have been transformed, under the influence of the high temperature in the presence of the lime and the steam, into the amorphous form, which is flinty, hornlike and highly resistant to attack by corrosive fluids.

While I have set forth specific details of my improved process and of the product, I desire that my invention shall be limited only by the prior art or by the appended claims.

I claim as my invention:

1. The method of producing a self-setting, quick-hardening, water-impervious and corrosion and abrasion resistant shape, which consists of intimately mixing 30 to 50 parts by weight of finely ground calcareous hydraulic cement with 50 parts by weight of finely ground siliceous material, adding thereto 15 to 20 parts by weight of asbestos fiber and sufficient water to form a slurry, forming the shape, subjecting the formed shape to pressure ranging up to 6,000 pounds per square inch, permitting the compressed formed shape to stand at ordinary temperatures, and then indurating the shape under steam pressure until all the free lime therein is brought into chemical combination with the silica therein and until the shape has become highly impervious to the passage of moisture.

2. The method of producing a self-setting, quick-hardening, water impervious and corrosion and steam resistant shape, which consists of intimately mixing 30 to 50 parts by weight of finely ground calcareous hydraulic cement with 70 to 50 parts by weight of finely ground siliceous materials, adding thereto 15 to 20 parts by weight of asbestos fiber and sufficient water to impart thereto an earth-dry consistency, forming the shape, subjecting the formed shape to pressure ranging up to 6,000 pounds per square inch, and then indurating under steam pressure until all free lime therein is brought into chemical combination with the silica therein and until the shape has become highly impervious to the passage of moisture.

GIOVANNI MORBELLI.